(12) United States Patent
Kuo et al.

(10) Patent No.: US 9,390,311 B2
(45) Date of Patent: Jul. 12, 2016

(54) FINGERPRINT IDENTIFICATION METHOD

(71) Applicant: NanoGate Biometric Inc., Taipei (TW)

(72) Inventors: Peng-Chia Kuo, Taipei (TW); Che-Lin Kuo, Taipei (TW)

(73) Assignee: NANOGATE BIOMETRIC INC., Taipei (TW)

( * ) Notice: Subject to any disclaimer, the term of this patent is extended or adjusted under 35 U.S.C. 154(b) by 62 days.

(21) Appl. No.: 14/516,494

(22) Filed: Oct. 16, 2014

(65) Prior Publication Data

US 2016/0110583 A1   Apr. 21, 2016

(51) Int. Cl.
 *G06K 9/00* (2006.01)
 *G06K 9/48* (2006.01)

(52) U.S. Cl.
 CPC ............ *G06K 9/00093* (2013.01); *G06K 9/001* (2013.01); *G06K 9/0008* (2013.01); *G06K 9/00013* (2013.01); *G06K 9/00073* (2013.01)

(58) Field of Classification Search
 None
 See application file for complete search history.

(56) References Cited

U.S. PATENT DOCUMENTS

| 5,982,914 A | * | 11/1999 | Lee | G06K 9/00073 382/124 |
| 2009/0226052 A1 | * | 9/2009 | Fedele | G06K 9/00046 382/125 |
| 2009/0310831 A1 | * | 12/2009 | Zhang | G06K 9/00093 382/125 |
| 2014/0294262 A1 | * | 10/2014 | Schuckers | G06K 9/00114 382/125 |

* cited by examiner

*Primary Examiner* — David F Dunphy
(74) *Attorney, Agent, or Firm* — Cheng-Ju Chiang (57) ABSTRACT

The present invention provides fingerprint-based verification system and fingerprint identification method. The fingerprint-based verification system verifies identify by analyzing biometric minutiae including the ridges and pores on a fingerprint. The fingerprint identification method comprises a step for obtaining a first fingerprint, a step for obtaining a second fingerprint, and a step for comparing the first fingerprint and the second fingerprint. The present invention provides effective systems and methods for mitigating identity fraud.

14 Claims, 10 Drawing Sheets

# FINGERPRINT IDENTIFICATION METHOD

TECHNICAL FIELD

The present invention relates to methods for identifying fingerprints and mitigating identity frauds. More particularly, the present invention relates to methods of pore-to-pore comparisons to identify fingerprints and mitigate identity frauds.

DESCRIPTION OF THE RELATED ART

Credit card and check fraud damage the financial industry with billions of dollars every year. One of the major causes is that financial instruments use only a token, such as a credit card, to identify the identity and allow access to the financial accounts.

Though that PIN numbers and social security numbers are also used to restrain fraud, PIN numbers and social security numbers may, as is well known, be easily obtained by fraud perpetrators with various surreptitious methods.

In order to mitigate frauds, security solution providers have proposed the use of biometrics, representing the unique physical characteristics of an individual, to identify the identity of that individual in conjunction with conventional identification methods such as methods utilizing identity cards, registration account, or account number.

However, a massive system may contain enormous information. For example, more than 110 million identities, each representing a card holder in the US, are stored in a system owned by a credit bureau. For such a huge system, even a biometric identification method with the modest false rejection and false acceptance rates may end up with mistakes.

Accordingly, fingerprint identification methods with new identification criteria and improved reliability are in need for both mitigating identity fraud and suppressing error rates.

SUMMARY

To provide methods with improved accuracy, some embodiments of the present invention disclose methods for identifying fingerprints. The methods initiate with a step for obtaining a first fingerprint image from a first subject and a step for extracting a first ridge-based information and a first pore-based information from the first fingerprint image. The methods further obtain a second fingerprint image from a second subject and then extract a second ridge-based information and a second pore-base information from the second fingerprint image. Both of the first pore-base information and the second pore-base information comprise descriptors representing the features of pores. To determine the identity of a second subject, the methods then compare the second ridge-base information to the first ridge-based information to generate a ridge similarity score, and compare the second pore-base information to the first pore-based information to generate a pore similarity score. With the ridge similarity score and the pore similarity score obtained in the previous steps, the identity of the second subject is then determined.

To provide methods with improved reliability, some other embodiments of the present invention disclose methods for mitigating identity frauds. The methods initiate with a step for obtaining a first fingerprint image from a first subject and a step for extracting a first pore-base information from the first fingerprint image. The methods further obtain a second fingerprint image from a second subject and extract a second pore-base information from the second fingerprint image. Both of the first pore-base information and the second pore-base information comprise descriptors representing the features of pores. To examine the reality of a second subject, the methods then compare the first pore-base information and the second pore-base information to generate a pore similarity score and determine whether the pore similarity score satisfied a pre-determined value.

Some embodiments of the present invention relates to methods with reduced false acceptance rate and false rejection rate. Some other embodiments of the present invention disclose several identification criteria based on the ridge-based information, the pore-based information, or the combination sets thereof to identify the identity of an individual. Still some other embodiments of the present invention provide methods to mitigate fraud by using impostor fingerprints. Still yet some other embodiments of the present invention provide mechanisms for suppressing the error rate by random pore matching.

DESCRIPTION OF THE PREFERRED EMBODIMENTS

Methods for Identifying Fingerprints

Figure 1:
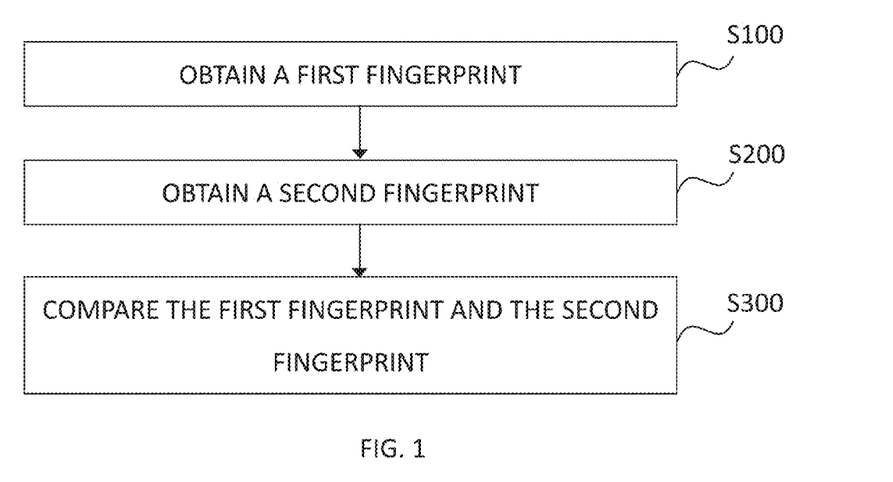
FIG. 1 is a flow diagram illustrating a method for identifying fingerprints and mitigating identity frauds, according to some embodiments of the present invention.

Some embodiments of the present invention disclose herein relates to methods for identifying fingerprint. As illustrated in FIG. 1, the methods comprise a step for obtaining a first fingerprint (S100), a step for obtaining a second fingerprint (S200), and a step for comparing the first fingerprint and the second fingerprint (S300). The methods may be used to verify a subject by examining the physical characteristics naturally presented on the subject.

Figure 2:
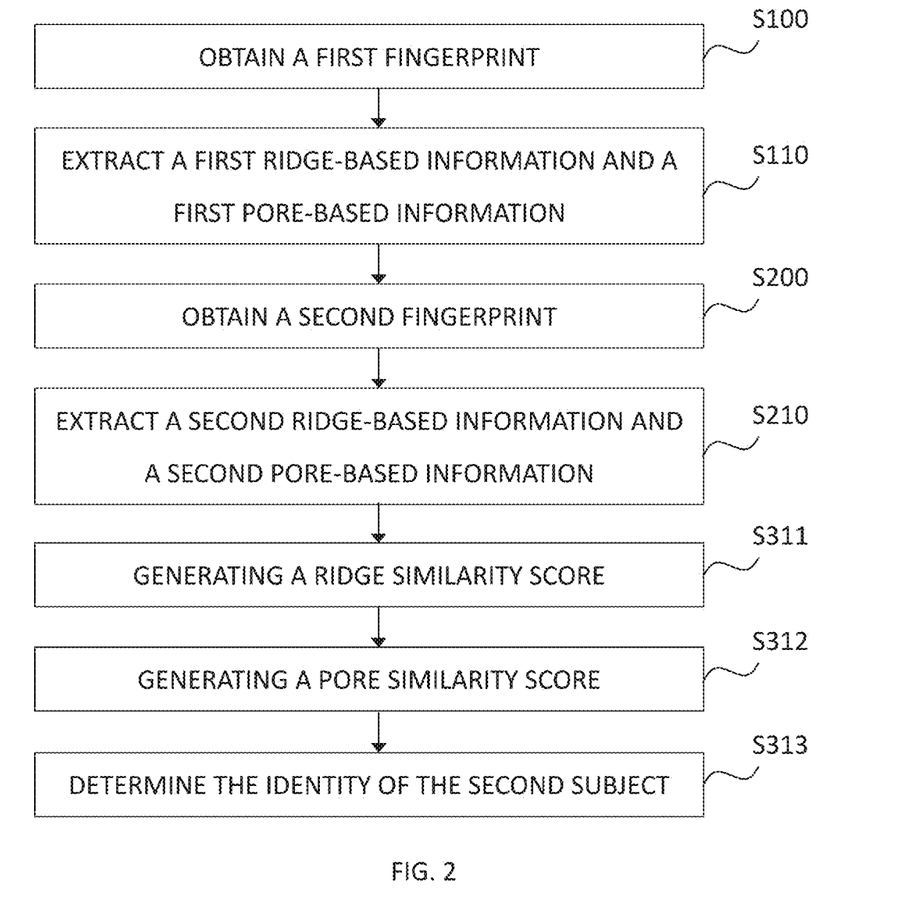
FIG. 2 is a flow diagram illustrating a method for identifying fingerprints, according to some embodiments of the present invention.

FIG. 2 is a flow diagram illustrating a method for identifying fingerprints, according to some embodiments of the present invention. The methods comprise a step for obtaining a first fingerprint (S100), a step for extracting a first ridge-based information and a first pore-based information from the first fingerprint image (S110), a step for obtaining a second fingerprint (S200), a step for extracting a second ridge-based information and a second pore-based information from the second fingerprint image (S210), a step for generating a ridge similarity score by comparing the first ridge-based information and the second ridge-based information (S311), a step for generating a pore similarity score by comparing the first pore-based information and the second pore-based information (S312), and a step for determining the identity of the second subject based on the ridge similarity score and the pore similarity score (S313).

The step for obtaining a first fingerprint is referred to as a registration process in some embodiments. The registration process includes several steps. The first step is for obtaining a first fingerprint image comprising ridge-based minutiae and pore-based minutiae. The second step is for converting the ridge-based minutiae and the pore-based minutiae into a first ridge-based template and a first pore-based template respectively. The third step is for merging the first ridge-based template and the first pore-based template into a registration set.

The step for obtaining a second fingerprint is referred to as a bid process in some embodiments. The bid process includes several steps. The first step is for obtaining a second fingerprint image comprising ridge-based minutiae and pore-based minutiae. The second step is for converting the ridge-based minutiae and the pore-based minutiae into a second ridge-based template and a second pore-based template respectively. The third step is for merging the second ridge-based template and the second pore-based template into a bid set.

The step for comparing the first fingerprint and the second fingerprint is referred as to an identification process in some embodiments. The identification process includes several steps. The first step is for comparing the registration set and the bid set. The second step is for generating a ridge similarity score and a pore similarity score. The third step is for determining that whether the ridge similarity score and the pore similarity score satisfy a pre-determined criterion.

Methods for Mitigation Identity Fraud

Some embodiments of the present invention disclose herein relates to methods for mitigating identity fraud. As illustrated in FIG. 1, the methods comprise a step for obtaining a first fingerprint (S100), a step for obtaining a second fingerprint (S110), and a step for comparing the first fingerprint and the second fingerprint (S120). The methods may be used to recognize artificial fingerprints by examining the characteristics naturally presented on a human finger. Moreover, the method may be performed with the methods for identifying fingerprint disclose in the present invention or performed independently.

Figure 3:
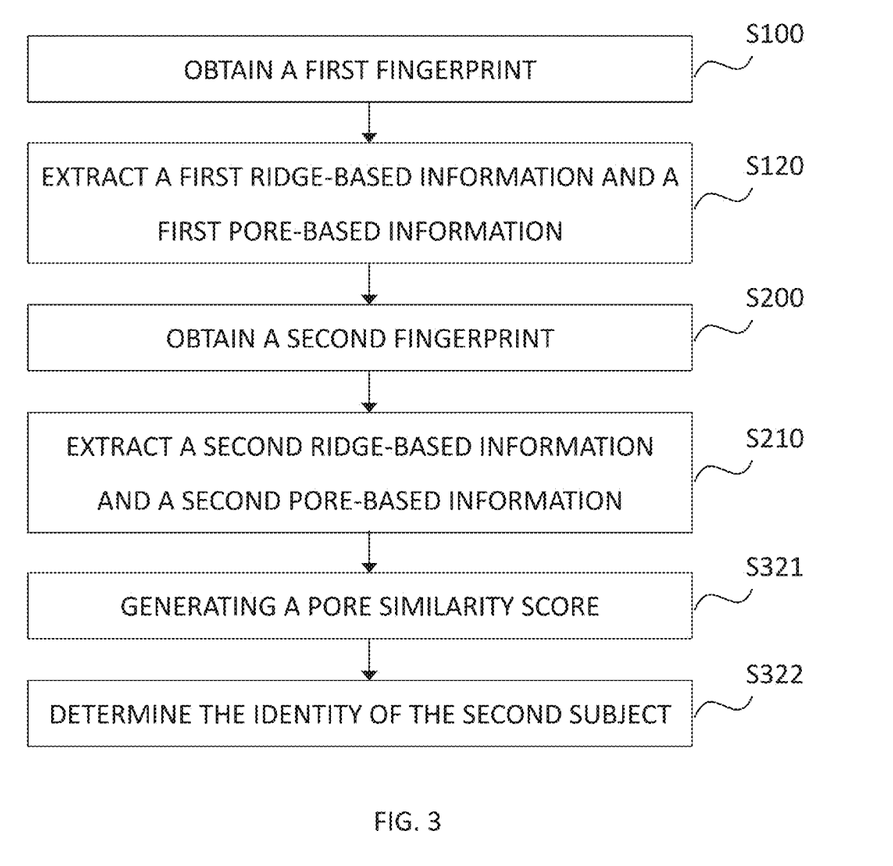
FIG. 3 is a flow diagram illustrating a method for mitigating identity frauds, according to some embodiments of the present invention.

FIG. 3 is a flow diagram illustrating a method for mitigating identity frauds, according to some embodiments of the present invention. The methods comprise a step for obtaining a first fingerprint (S100), a step for extracting a first pore-based information from the first fingerprint image (S120), a step for obtaining a second fingerprint image from a second subject (S200), a step for extracting a second pore-based information from the second fingerprint image (S210), a step for generating a pore similarity score by comparing the first pore-based information and the second pore-based information (S321), and a step for determining whether the pore similarity score satisfies a pre-determined value (S322).

The step for obtaining a first fingerprint in the methods for mitigating identity fraud is referred to as a registration process in some embodiments. The registration process includes several steps. The first step is for obtaining a first fingerprint image comprising ridge-based minutiae and pore-based minutiae. The second step is for converting the pore-based minutiae into a first pore-based template.

The step for obtaining a second fingerprint in the methods for mitigating identity fraud is referred to as a bid process in some embodiments. The bid process includes several steps. The first step is for obtaining a second fingerprint image comprising ridge-based minutiae and pore-based minutiae. The second step is for converting the pore-based minutiae into a second pore-based template.

The step for comparing the first fingerprint in the methods for mitigating identity fraud and the second fingerprint is referred as to an identification process in some embodiments. The identification process includes several steps. The first step is for comparing the first pore-based template and the second pore-based template. The second step is for generating a pore similarity score, and the third step is for determining that whether the pore similarity score satisfies a pre-determined criterion.

Fingerprint-Based Verification System

Figure 4:
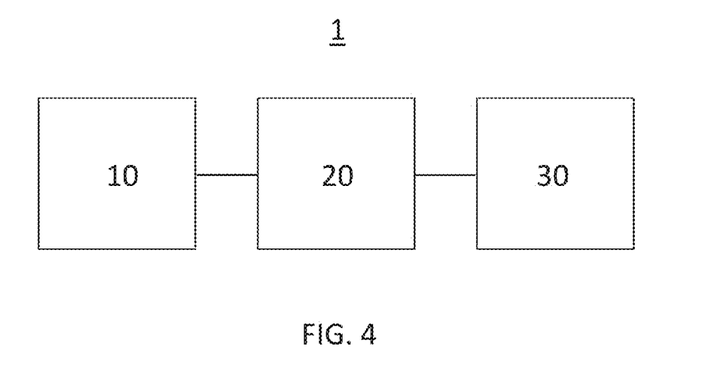
FIG. 4 is a schematic diagram illustrating a fingerprint-based verification system, according to some embodiments of the present invention.

Some embodiments of the present invention disclose herein relates to a fingerprint-based verification system. As illustrated in FIG. 4, the fingerprint-based verification system 1 comprises an image sensor 10, a processing unit 20 connected to the image sensor 10, and a memory unit 30 connected to the processing unit 20. Under same situation, the fingerprint-based verification system 1 may be used to determine the identity of a subject.

The image sensor is configured for capturing the minutiae on a finger. The image sensor may be an optical sensor, a capacity sensor, or a thermal sensor and resolution of the image sensor may vary depending on the needs (e.g., 500 dpi for a personal device and 2,000 dpi for a business device). Those minutiae on a finger (e.g., ridges, valleys, and pores) usually occur in 3D form and, with the image sensor and the processing unit, may be captured as a fingerprint image in grayscale format. As a flatten image, the ridges are transformed into dark pixels and the valleys and pores are transformed into white pixels in the fingerprint image. Moreover, the fingerprint images may be stored in the memory device for further uses under some situations.

Figure 5:
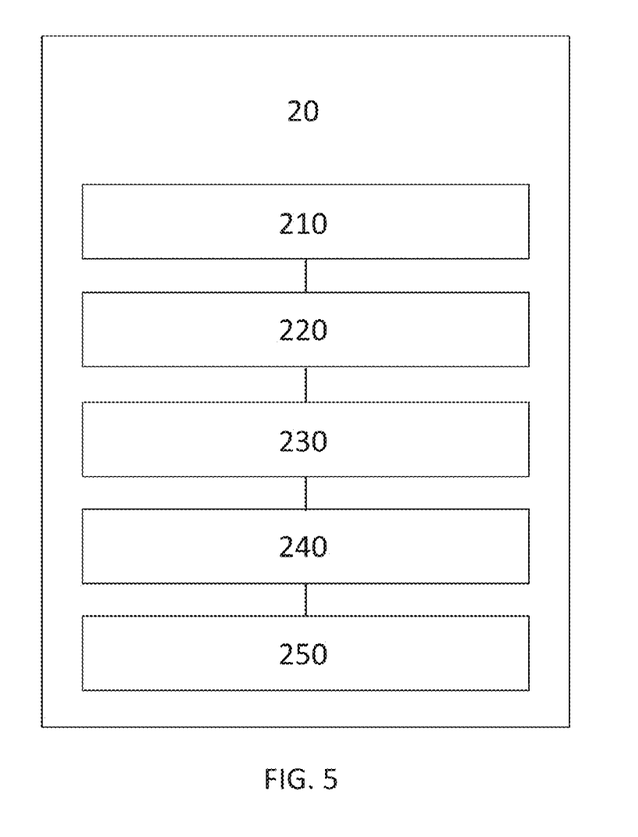
FIG. 5 is a schematic diagram illustrating a processing unit, according to some embodiments of the present invention.

The processing unit is configured for processing the fingerprint images. As illustrated in FIG. 5, a schematic diagram illustrating a processing unit according to some embodiments of the present invention, the processing unit 20 may comprise one selected from the group consisting of an image quality enhancement module 210, an image format transformation module 220, a minutia extraction module 230, a minutia template creation module 240, a minutia template comparison module 250, and the combination thereof.

Image Quality Enhancement Module

Figure 6:
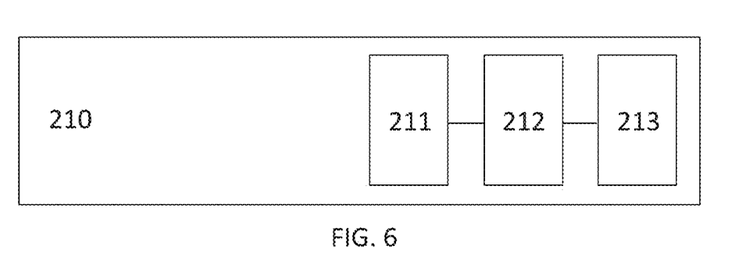
FIG. 6 is a schematic diagram illustrating an image quality enhancement module, according to some embodiments of the present invention.

FIG. 6 is a schematic diagram illustrating an image quality enhancement module, according to some embodiments of the present invention. The image quality enhancement module 210 comprises three sub-modules connected together. The first sub-module 211, a noise reduction module, is configured to perform a noise reduction function. The second sub-module 212, a smoothening module, is configured to utilize a smoothening filter to enhance the image quality for clearly presenting the ridge boundaries. The third sub-module 213, a contrast enhancement module, is configured to utilize a contrast enhancement filter to enhance the image quality for clearly presenting small pores. Use of the third sub-module 213 is recommended for capacitive sensors with resolution of 500 dpi or lower.

Image Format Transformation Module

Figure 7:
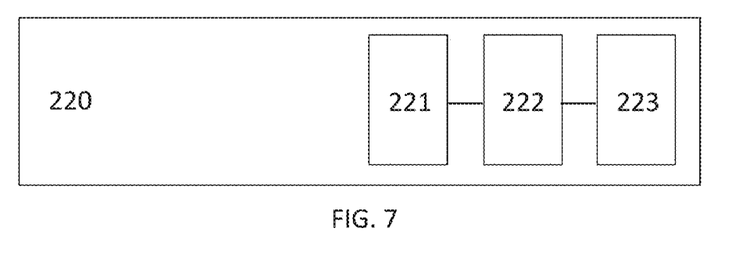
FIG. 7 is a schematic diagram illustrating an image format transformation module, according to some embodiments of the present invention.

FIG. 7 is a schematic diagram illustrating an image format transformation module, according to some embodiments of the present invention. The image format transformation module 220 comprises three sub-modules connected together. The first sub-module 221, a flow-map module, is configured to establish a flow map from the fingerprint image represented in spatial domain. The flow map is a grayscale image represented in frequency domain and is established for anchoring the singular points (e.g., the core zone and delta zone of a fingerprint). The second sub-module 222, a histogram binarization module, is configured to perform a binarization process which transforms ridges into dark pixels and transforms valleys and pores into white pixels. The last sub-module 223, a skeletonization module, is configured to perform a skeletonization process which converts ridges on the binarized image into one-pixel width lines on a skeleton graph.

Minutia Extraction Module

Figure 8:
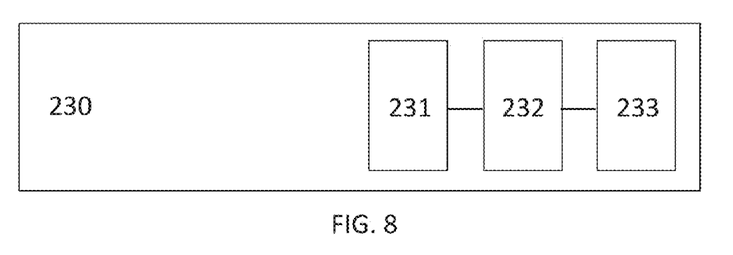
FIG. 8 is a schematic diagram illustrating a minutia extraction module, according to some embodiments of the present invention.

FIG. 8 is a schematic diagram illustrating a minutia extraction module, according to some embodiments of the present invention. The minutia extraction module 230 comprises three sub-modules connected together. The first sub-module 231 is configured to perform a level-1 biometric minutiae extraction process; the second sub-module 232 is configured to perform a level-2 biometric minutiae extraction process; and, the third sub-module 233 is configured to perform a level-3 biometric minutiae extraction process.

The level-1 biometric minutiae extraction process contains four functions. The first function is applied to anchor the singular points, such as the core zone and delta zone, on a fingerprint image. The second function is applied to anchor the deflection points of each ridge. The third function is applied to utilize the location information of the singular points and deflection points to determine a ridge class for a fingerprint. For example, a fingerprint may fall in a circle class, ellipse class, whorl class, loop class, double-loop class, arch class, tent class, or the other classes. The fourth function is applied to utilize the location information of the singular points and deflection points to establish a skeleton coordination system, containing the skeleton graph representing the ridge, for cooperating with the level-2 and level-3 biometric minutiae extraction processes to build up a set containing ridge-based templates and pore-based templates.

The level-2 biometric minutiae extraction process is applied to anchor feature points (e.g., the branch points and end points on a fingerprint). The level-2 biometric minutiae extraction process contains two functions. The first function is applied to anchor the branch points representing ridge-bifurcations. The second function is applied to anchor endpoints representing ridge-endings. A fingerprint image usually contains about 20 feature points and those feature points may be utilized in further applications.

The level-3 biometric minutiae extraction process is applied to anchor pore-based minutiae. The level-3 biometric minutiae extraction process contains five functions; each data generated by the five functions represents a descriptor for a pore. The first function anchors pores on the ridges. The second function anchors pores on the islands. The third function anchors the scar regions. The scar regions usually contain no pore and flow orientation of the scar region usually is intercepted by the flow orientation of ridge. The fourth function determines the parameters of each pore on the fingerprint image. The fifth function provides a mapping mechanism to incorporate the pores into the skeleton coordination system established in the level-1 biometric minutiae extraction process.

Minutia Template Creation Module

Figure 9:
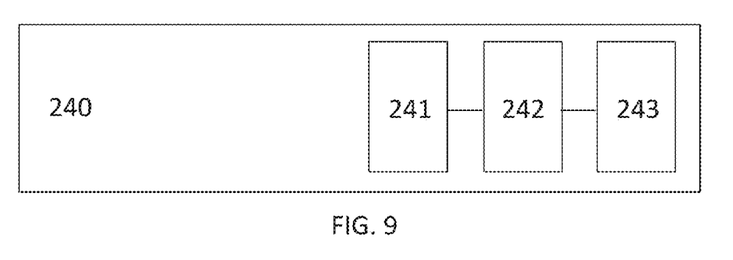
FIG. 9 is a schematic diagram illustrating a minutia template creation module, according to some embodiments of the present invention.

FIG. 9 is a schematic diagram illustrating a minutia template creation module, according to some embodiments of the present invention. The minutia template creation module 240 is configured to transforms minutiae, obtained by the minutiae extraction module, into a registration set or a bid set. The registration set or the bid set may be further saved into a database of the memory unit. The minutia template creation module contains three connected sub-modules which are a level-1 template creation module 241, a level-2 template creation module 242, and a level-3 template creation module 243 respectively.

With a first subject, the level-1 template creation module 241 would convert the biometric minutiae extracted in the level-1 biometric minutiae extraction process into a level-1 registration set in the registration process. The biometric minutiae may, as described in the level-1 biometric minutiae extraction process, be the singular points, the deflection points, the ridge class, the skeleton coordination system containing the skeleton graph representing the ridges, or the combination thereof. The level-1 registration set is then stored to a registration database of the memory unit.

With the first subject, the level-2 template creation module 242 would convert the biometric minutiae extracted in the level-2 biometric minutiae extraction process into a level-2 registration set in the registration process. The biometric minutiae may, as described in the level-2 biometric minutiae extraction process, be the branch points, the end points, or the combination thereof. The level-2 registration set is then stored to the registration database.

With the first subject, the level-3 template creation module 243 would convert the biometric minutiae extracted in the level-3 biometric minutiae extraction process into a level-3 registration set in the registration process. The biometric minutiae may be any of the biometric minutiae described in the level-3 biometric minutiae extraction process. The level-3 registration set is then stored to the registration database.

With a second subject, the level-1 template creation module 241 would convert the biometric minutiae extracted in the level-1 biometric minutiae extraction process into a level-1 registration set in the bid process. The biometric minutiae may, as described in the level-1 biometric minutiae extraction process, be the singular points, the deflection points, the ridge class, the skeleton coordination system containing the skeleton graph representing the ridges, or the combination thereof. The level-1 bid set is then stored to a bid database of the memory unit.

With the second subject, the level-2 template creation module 242 would convert the biometric minutiae extracted in the level-2 biometric minutiae extraction process into a level-2 registration set in the bid process. The biometric minutiae may, as described in the level-2 biometric minutiae extraction process, be the branch points, the end points, or the combination thereof. The level-2 bid set is then stored to the bid database.

With the second subject, the level-3 template creation module 243 would convert the biometric minutiae extracted in the level-3 biometric minutiae extraction process into a level-3 registration set in the bid process. The biometric minutiae may be any of the biometric minutiae described in the level-3 biometric minutiae extraction process. The level-3 bid set is then stored to the bid database.

Descriptors

Figure 10:
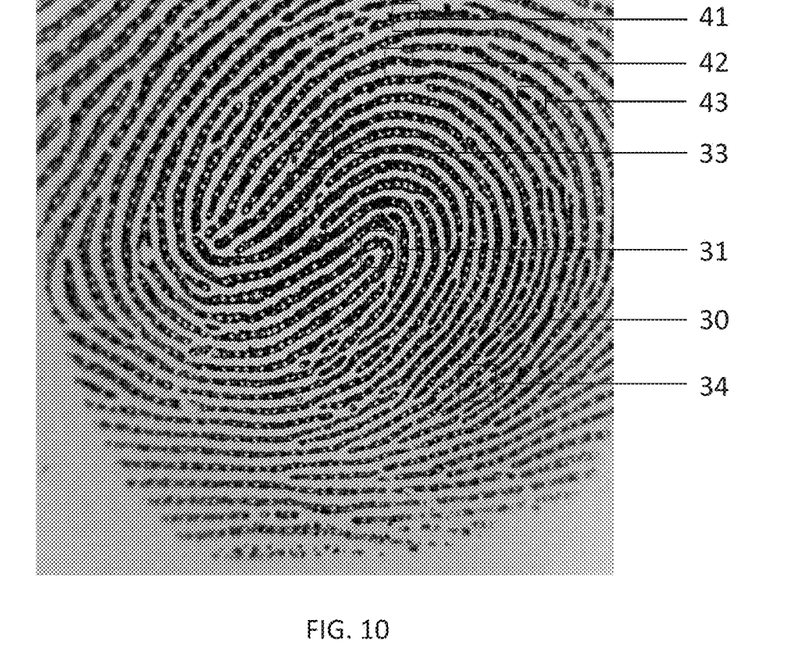
FIG. 10 is a fingerprint image captured by an image sensor, according to some embodiments of the present invention.
Figure 11:
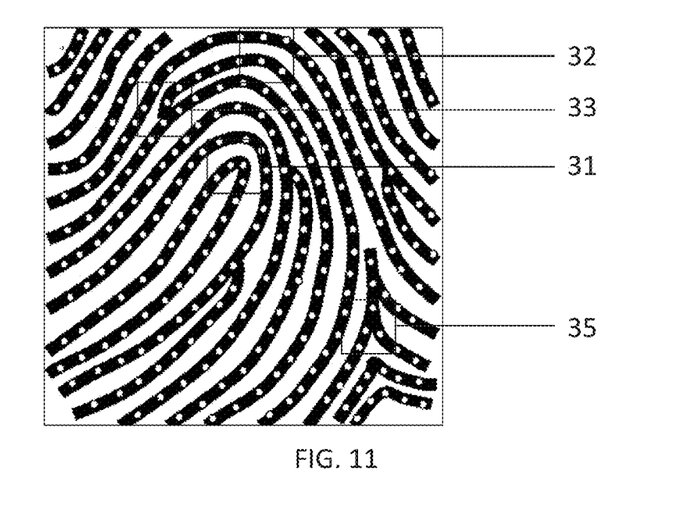
FIG. 11 is a schematic diagram illustrating a binarized fingerprint, according to some embodiments of the present invention.

FIG. 10 is a fingerprint image captured by an image sensor, according to some embodiments of the present invention. As shown in FIG. 10, the fingerprint image comprises some features relates to ridges 30, such as the core region 31, the ridge-bifurcation 33, and the island 34. With the binarization process, a fingerprint image as illustrated in FIG. 11 clearly shows some features on that fingerprint image including the core region 31, the defection 32, the ridge-bifurcation 33, and the delta region. In addition to the ridges 30, each pore 40 on the fingerprint image has different properties which are unique from pore to pore. Ridges on a fingerprint image usually provide about 20 feature points could be utilized to identify the identity of a person, pores on the same fingerprint image, however, provides more than 2000 points could be utilized to perform the same task.

In some embodiments, the method provides several classification systems for classifying the properties of a pore on a fingerprint image. Each of the descriptors designated to a pore represents a property under one or more classification systems. By spotting the pores with descriptors, the identity of a subject may be recognized identified efficiently.

Figure 14A:
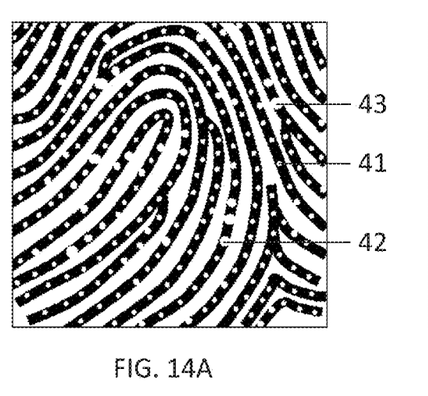
FIGS. 14A and 14B are schematic diagrams illustrating a conversion under the enclosure process, according to some embodiments of the present invention.
Figure 14B:
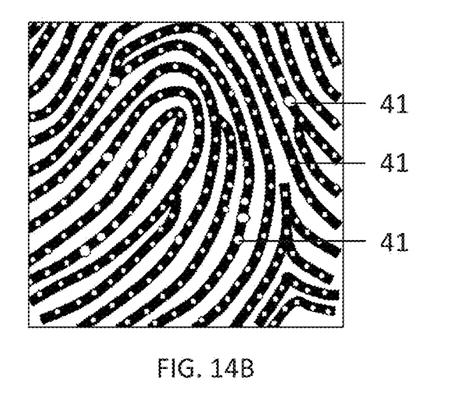

In a first classification system, a pore in a fingerprint image may, as illustrated in FIG. 10 be classified as a closed pore 41, a half closed pore 42, or open pore 43 based on the completeness of the pore. However, as illustrated in FIG. 14A and FIG. 14B, half closed pores 42 and open pores 43 on a fingerprint image will undergo enclosure process and form closed pores 41 for some other classification.

Figure 12A:
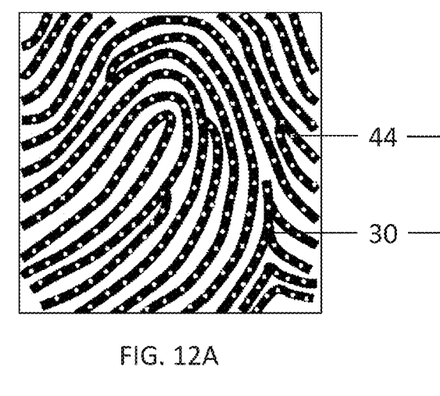
FIGS. 12A and 12B are schematic diagrams illustrating a conversion under the skeletonization process, according to some embodiments of the present invention.
Figure 12B:
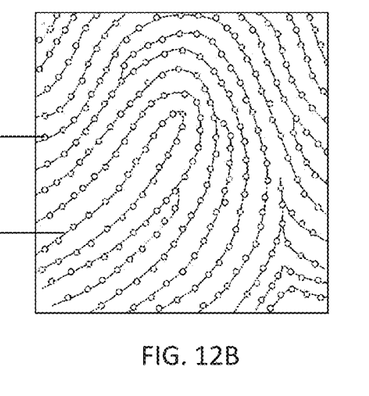
Figure 13A:
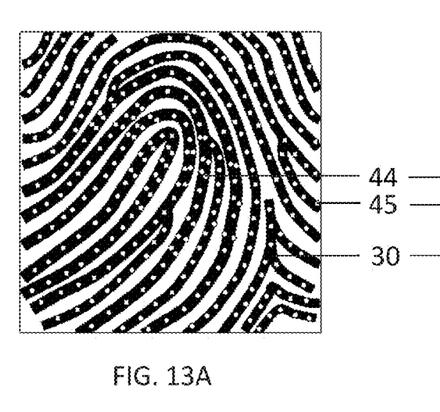
FIGS. 13A and 13B are schematic diagrams illustrating a conversion under the skeletonization process, according to some embodiments of the present invention.
Figure 13B:
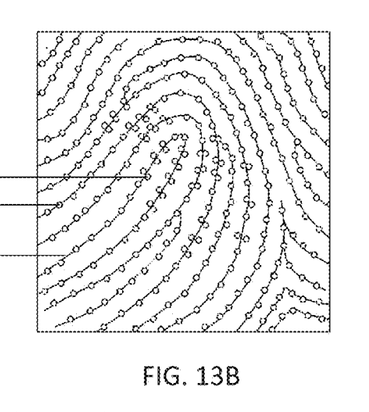

In a second classification system, the pairing status of a pore would be classified as single or a paired. As illustrated in FIG. 12A and FIG. 13A, the pairing status of pores chaining in series on a ridge 30 would be identified as single 45; on the contrary, pores chaining in parallel would be classified paired 44.

Figure 16:
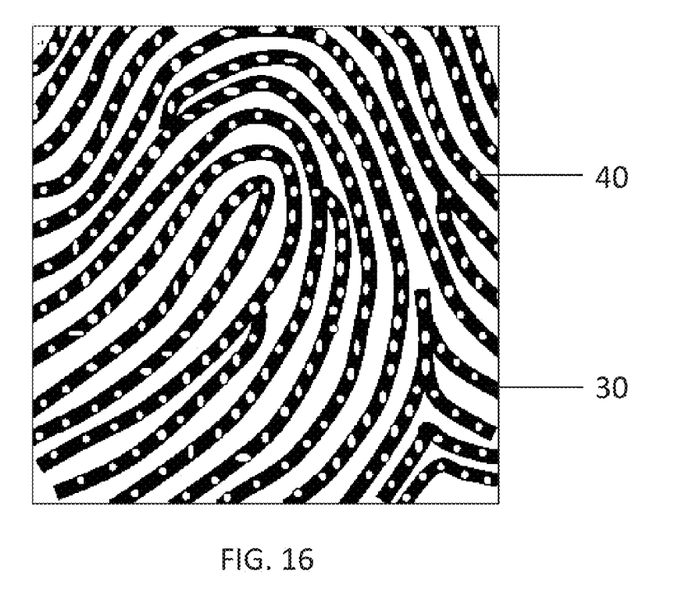
FIG. 16 is a schematic diagram illustrating the pores with different shapes and angles, according to some embodiments of the present invention.

FIG. 16 is a schematic diagram illustrating the pores with different shapes and angles, according to some embodiments of the present invention. In a third classification system, a pore 40 may be classified into a triangle, a rectangle, a circle, a quarter of moon, or a dumbbell based on the shape of the pore 40. Furthermore, a triangle may be further divided into an acute triangle, a right triangle, or an obtuse triangle pore. A rectangle may be further divided into a square, a rectangle, a trapezoid, a diamond, or a parallelogram. Similarly, a circle may be further divided into a circle, a symmetric ellipse, an asymmetric ellipse, or an egg, or a bell. A quarter of moon may be further divided into a first-quarter of moon pore or a last-quarter of moon pore. A dumbbell may be further divided into a symmetric dumbbell or an asymmetric dumbbell pore.

Figure 15:
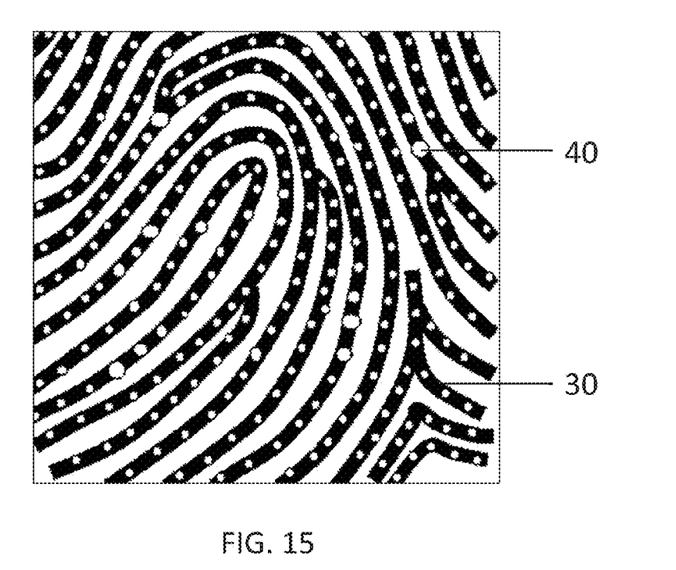
FIG. 15 is a schematic diagram illustrating the pores with different sizes, according to some embodiments of the present invention.

The fourth classification system comprises several sub-systems and is established on an X-Y coordinate system virtually existing on a fingerprint image. The first sub-system classifies a pore based on the position of the pore in the X-Y coordinate system. As illustrated in FIG. 15 and FIG. 16, the geometric properties of a pore are highly diverse. The second sub-system classifies a pore based on the geometric of the pore, such as the center of mass, length of the long-axis, length of the short-axis, orientation, and area. Then all local center of mass, long-axis and short-axis orientation are transformed into global long-axis and short-axis orientation.

Figure 17A:
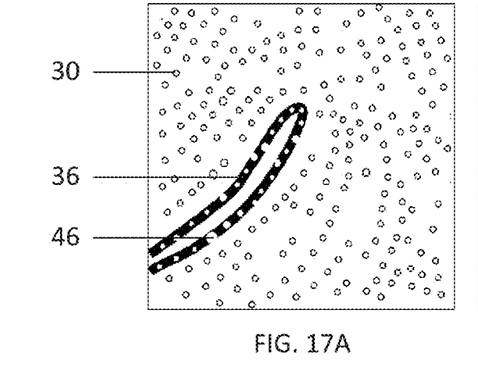
FIG. 17A is a schematic diagram illustrating a level-1 ridge and pores in the first order, according to some embodiments of the present invention.
Figure 17B:
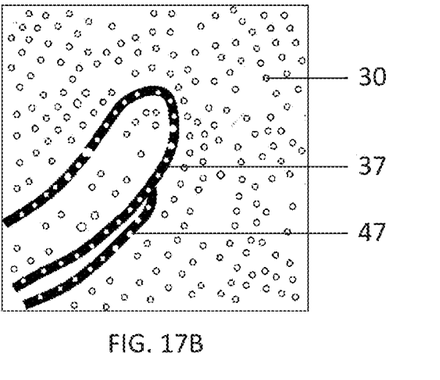
FIG. 17B is a schematic diagram illustrating a level-2 ridge and pores in the second order, according to some embodiments of the present invention.

The fifth classification system is established on a skeleton coordinate system based on the skeleton graph which represents the ridges on a fingerprint image. As illustrate in FIGS. 12A-13B, the skeletonization process converts the ridges on a binarized fingerprint image into one-pixel width lines on a skeleton graph. In a skeleton graph, ridges are classified in hierarchy to generate a skeleton coordinate system. As illustrated in FIGS. 17A and 17B, the index of a ridge located at the core area or the innermost area of a fingerprint is designated as an index-1 ridge 36, and the index of a ridge located next to the index-1 ridge 36 is designated as an index-2 ridge 37, and so on. Under this skeleton coordinate system, a pore 30 positioned on the index-1 ridge 36 would be classified into the first order 46, and a pore 30 positioned on the index-2 ridge 37 would be classified into second order 47, and so on.

Figure 18A:
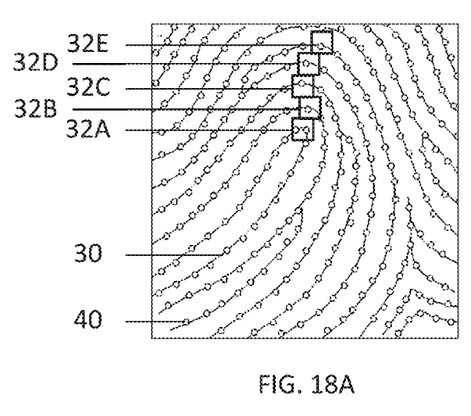
FIG. 18A is a schematic diagram illustrating the deflection points on a skeleton graph, according to some embodiments of the present invention.
Figure 18B:
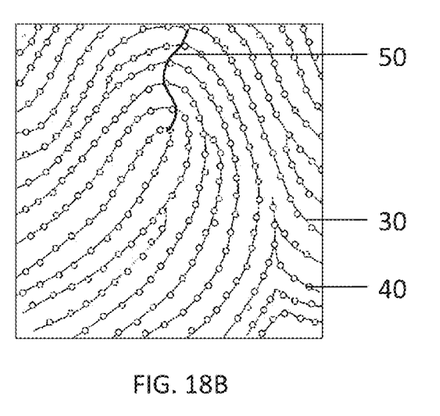
FIG. 18B is a schematic diagram illustrating the principal axis on a skeleton graph, according to some embodiments of the present invention.
Figures 19A, 19B:
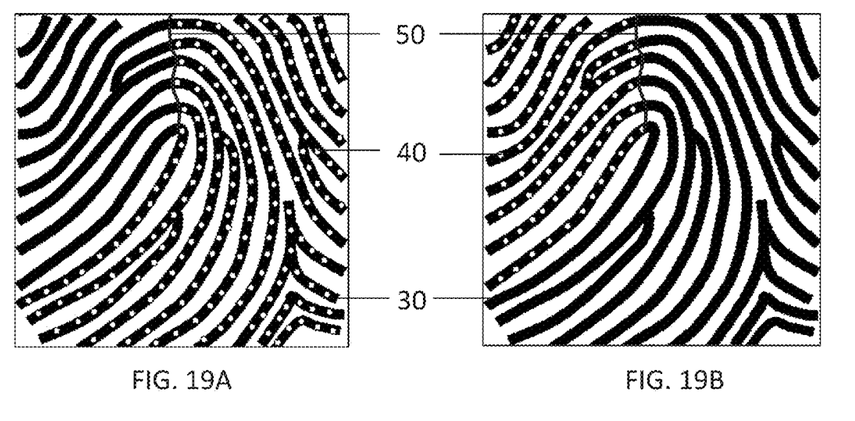
FIG. 19A is a schematic diagram illustrating the anticlockwise semi-ridge defined by a principal axis, according to some embodiments of the present invention.
FIG. 19B is a schematic diagram illustrating the clockwise semi-ridge defined by a principal axis, according to some embodiments of the present invention.

The sixth classification system is established on indicators derived from the skeleton graph which represents the ridges on a fingerprint image. For instance, one indicator may be a principal axis. As shown in FIGS. 18A and 18B, a principal axis 50 is defined as the virtual line crosses all deflection points (32A, 32B, 32C, 32D, and 32E) on the skeleton graph. Now referring to FIGS. 19A and 19B, based on the principal axis 50, the skeleton graph may be divided into two semi-ridges, a clockwise semi-ridge and an anticlockwise semi-ridge. The pores on the fingerprint image may be simply classified into two groups based on the two semi-ridges.

FIG. 16 is a schematic diagram illustrating the pores with different shapes and angles, according to some embodiments of the present invention. The seventh classification system classified a pore 40 based on the angle of the pore 40. This classification system may base on the X-Y coordinate system or the skeleton coordinate system disclose in the fourth and fifth classification system respectively. The angle of a pore 40 may be determined based on the angle between a reference and a parameter, such as the long-axis or the short axis, of the pore 40.

The eighth classification system is also based on the principal axis disclose in the sixth classification system. As illustrated in FIG. 18B, a pore may be classified by the distance between the pore 40 to the principal axis 50.

The ninth classification system is also based on the principal axis disclose in the sixth classification system. A pore may be classified by the relative position of the vector of the pore to the semi-ridge.

In some embodiments, the aforementioned classification systems may incorporate some other factors to generate more descriptors for a pore. For example, a tenth classification system is provided to classify a pore based on the surrounding of the pore. The classes in this system comprises a first class characterized in that the pores are located on ridges, a second class characterized in that the pores are located on islands, and a third class is characterized in that a scar containing no pore.

The aforementioned minutiae and descriptors are defined as pore-based minutiae. In different embodiments, different combinations of the minutiae and descriptors may be stored in both the registration database and the bid database for further uses.

Identification Process

In some embodiments, the identification process compares a bid set to a registration set to generate a similarity score. The similarity score is one selected form the group consisting of a ridge similarity score, a pore similarity score, an overall similarity score, and the combination thereof. The similarity score representing the similarity between the registration set and the bid set may be used to verify the identity of a subject.

There are many inventions described and illustrated above. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

What is claimed is:

1. A method for identifying fingerprints, comprising:
   obtaining a first fingerprint image from a first subject;
   extracting a first ridge-based information and a first pore-based information from the first fingerprint image, wherein the first pore-based information comprises a first descriptor;
   obtaining a second fingerprint image from a second subject;
   extracting a second ridge-based information and a second pore-based information from the second fingerprint image, wherein the second pore-based information comprises a second descriptor;
   generating a ridge similarity score by comparing the first ridge-based information and the second ridge-based information;
   generating a pore similarity score by comparing the first pore-based information and the second pore-based information; and
   determining the identity of the second subject based on the ridge similarity score and the pore similarity score;
   wherein the first descriptor and the second descriptor each represents the pairing status of a pore.

2. The method according to claim 1, wherein the step of obtaining the first fingerprint image and the step of obtaining the second fingerprint image are performed with one selected from the group consisting of an optical sensor, a capacity sensor, and a thermal sensor.

3. The method according to claim 2, wherein the optical sensor has a resolution of 500 dpi or above.

4. The method according to claim 1, wherein the first ridge-based information and the second ridge-based information are each selected from the group consisting of a singular point, a deflection point, a ridge class, a skeleton coordinate system, a feature point, and the combination thereof.

5. The method according to claim 4, wherein the first pore-based information and the second pore-based information each comprises multiple descriptors.

6. The method according to claim 5, wherein one of the multiple descriptors represents the completeness of a pore.

7. The method according to claim 5, wherein one of the multiple descriptors represents the shape of a pore.

8. The method according to claim 5, wherein one of the multiple descriptors represents the order of a pore.

9. The method according to claim 5, wherein one of the multiple descriptors represents the angle between a pore and a reference.

10. A method for identifying fingerprints, comprising:
    obtaining a first fingerprint image from a first subject;
    converting half-closed pores and open pores in the first fingerprint image into closed pores;
    extracting a first ridge-based information and a first pore-based information from the first fingerprint image, wherein the first pore-based information comprises a first descriptor;
    obtaining a second fingerprint image from a second subject;
    converting half-closed pores and open pores in the second fingerprint image;
    extracting a second ridge-based information and a second pore-based information from the second fingerprint image, wherein the second pore-based information comprises a second descriptor;
    generating a ridge similarity score by comparing the first ridge-based information and the second ridge-based information;
    generating a pore similarity score by comparing the first pore-based information and the second pore-based information; and
    determining the identity of the second subject based on the ridge similarity score and the pore similarity score.

11. The method according to claim 10, wherein the step of obtaining the first fingerprint image and the step of obtaining the second fingerprint image each further comprises the sub-steps of:
    forming a principal axis on the skeleton coordinate system.

12. The method according to claim 11, wherein the first descriptor and the second descriptor each represents a semi-ridge, defined by the principal axis, which a pore is located at.

13. The method according to claim 12, wherein the first descriptor and the second descriptor each represents the distance between a pore and the principal axis.

14. A method for mitigating identity fraud, comprising:
  obtaining a first fingerprint image from a first subject;
  converting half-closed pores and open pores in the first fingerprint image into closed pores;
  extracting a first pore-based information from the first fingerprint image, wherein the first pore-based information comprises a first descriptor;
  obtaining a second fingerprint image from a second subject;
  converting half-closed pores and open pores in the second fingerprint image;
  extracting a second pore-based information from the second fingerprint image, wherein the second pore-based information comprises a second descriptor;
  generating a pore similarity score by comparing the first pore-based information and the second pore-based information; and
  determining whether the pore similarity score satisfies a pre-determined value.

* * * * *